Aug. 16, 1960                O. KNAPPE                2,949,037
    INSTRUMENT IN WHICH DISPLACEMENT OF AN ELEMENT IS
        DIRECTLY PROPORTIONAL TO THE SQUARE ROOT
                OF A FORCE APPLIED TO THE ELEMENT
Filed Jan. 27, 1958                                   4 Sheets-Sheet 3

Aug. 16, 1960   O. KNAPPE   2,949,037
INSTRUMENT IN WHICH DISPLACEMENT OF AN ELEMENT IS
DIRECTLY PROPORTIONAL TO THE SQUARE ROOT
OF A FORCE APPLIED TO THE ELEMENT
Filed Jan. 27, 1958   4 Sheets-Sheet 4

United States Patent Office 2,949,037
Patented Aug. 16, 1960

2,949,037

INSTRUMENT IN WHICH DISPLACEMENT OF AN ELEMENT IS DIRECTLY PROPORTIONAL TO THE SQUARE ROOT OF A FORCE APPLIED TO THE ELEMENT

Otto Knappe, Bad Oeynhausen-Rehme, Germany, assignor to Schoppe & Faeser G.m.b.H., Westfalen, Germany, a limited liability company of Germany Filed Jan. 27, 1958, Ser. No. 711,431

Claims priority, application Germany Feb. 1, 1957

20 Claims. (Cl. 74—106)

The invention relates to an equipment for producing a force as a square function of the displacement. Such installations are often required if a displacement or an angle of rotation produced by a force is to equal the square root of a force exerted. This is the case, for instance, with flowmeters for flowing measuring media. For such equipment it is often necessary that the displacement of a positioning element of the differential pressure gauge acting on a pointer or a recording system becomes linear proportionate to the rate of flow, although the differential pressure produced by the flowing medium is a square function of the rate of flow. The subject matter of the invention is explained by diagrammatic representations where identical components have the same designation.

Figure 1:
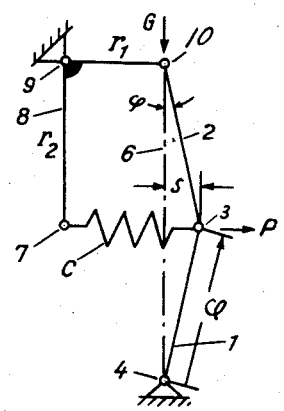

Fig. 1 shows an elbow lever with levers 1, 2 and hinge 3. The levers have the lengths $d$, one being stationary mounted at 4, the other displaceable at 5. In the direction of zero position 6 of the lever a force $G$, e.g. a weight, is exerted on the displaceable end of the elbow lever; in case of a deflection of the lever, this force has a component acting on hinge 3 vertical to the zero position and increasing the deflection. If the deflection angle $\varphi$ of the levers is so small that with adequate accuracy $$\varphi = \sin \varphi = \tan \varphi = s/d$$

$s$ standing for the displacement of the hinge from the zero position, then the force component $$P_s = -2G \cdot s/d$$

will be obtained as a result. Spring C at the hinge acts perpendicular to the line 6 of the levers, or, in other words perpendicular to the zero position of the elbow lever. Assuming the other end 7 to be stationary, the spring force would be $P_f = c \cdot s$, $c$ being the spring constant. However the end 7 acts with angle lever 8 comprising lever arms $r_1$ and $r_2$ and hinge 9 on the shiftable end of the elbow lever at 5. If $r_2/r_1 = i$, the force produced during the deflection of the elbow lever, exerted on the hinge and with vertical direction to the zero position of the lever, is given by relation:

$$P = c \cdot s - G \frac{2s}{d} + c \cdot i \cdot s \cdot \frac{2s}{d}$$

$$= s \cdot \left( c - 2\frac{G}{d} \right) + \frac{2ic}{d} \cdot s^2$$

When selecting the constant of the term in parentheses such that it becomes zero, we obtain:

$$P = \frac{2ic}{d} \cdot s^2 = k \cdot s^2$$

$k$ being a constant. The above condition for the term in parentheses results in the fact that with omitted angle lever 8 and stationary fictitious support the spring end 7 of the remaining system would be in a state of indifferent equilibrium at any slight deflection of the lever arm.

Figure 2:
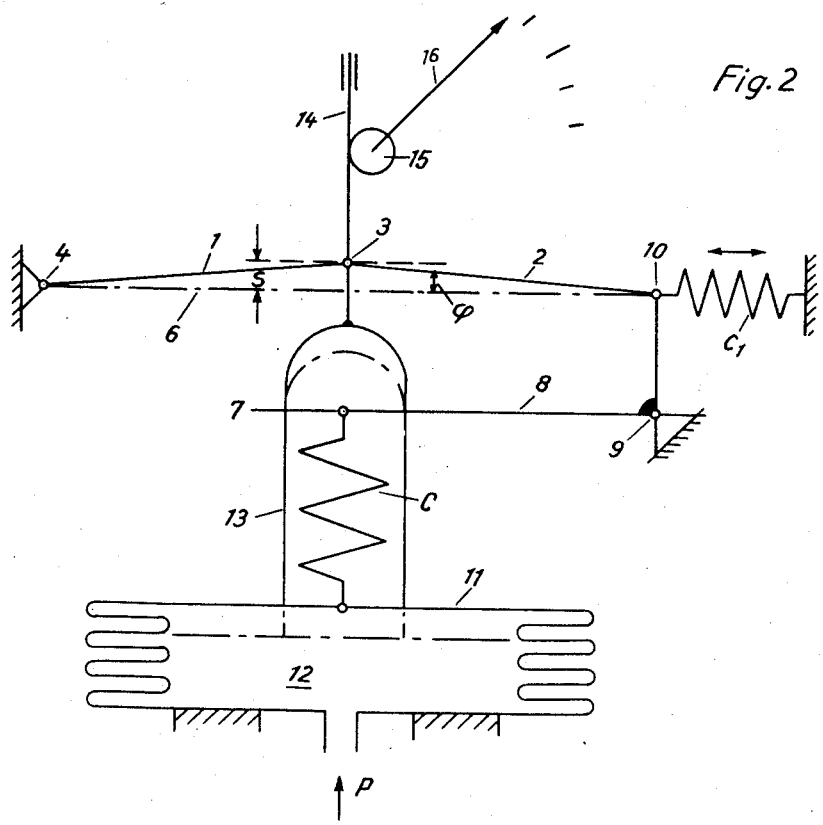

Fig. 2 illustrates the arrangement of the invention as shown in Fig. 1 for the purpose of producing a pointer displacement as a linear function of a measuring value if the latter is measured by a pressure being a square function of the measuring value. There is a difference inasmuch as spring C has the effect of a compression spring force would be $P_f = c \cdot s$, $c$ being the spring constant. according to the above assumption of small angles $\varphi$ is permissible. The measuring pressure $p$ acts on the movable side 11 of bellow 12 connected with elbow joint 3 across lever system 13. Spring C is arranged between the end 7 of angle lever 8 and the movable side 11. Furthermore gear rack 14 is connected to joint 3 of the elbow lever, the rack displacing via pinion 15 the pointer 16 over a scale with uniform division. The other reference symbols correspond to Fig. 1.

If $f$ represents the effective area of the movable side of bellow 12, the balance of the system is expressed as follows:

$$p \cdot f = c \cdot s - p_1 \cdot \frac{2s}{d} + c \cdot s \cdot i \cdot \frac{2s}{d}$$

$$= s \cdot \left( c - \frac{2p_1}{d} \right) + \frac{2ic}{d} \cdot s^2$$

If again the term in parantheses becomes zero, the linear member of the equation for $s$ is omitted, thus obtaining:

$$p = \frac{2ic}{df} \cdot s^2 = k_1 \cdot s^2$$

$k_1$ being again a constant.

Figure 3:
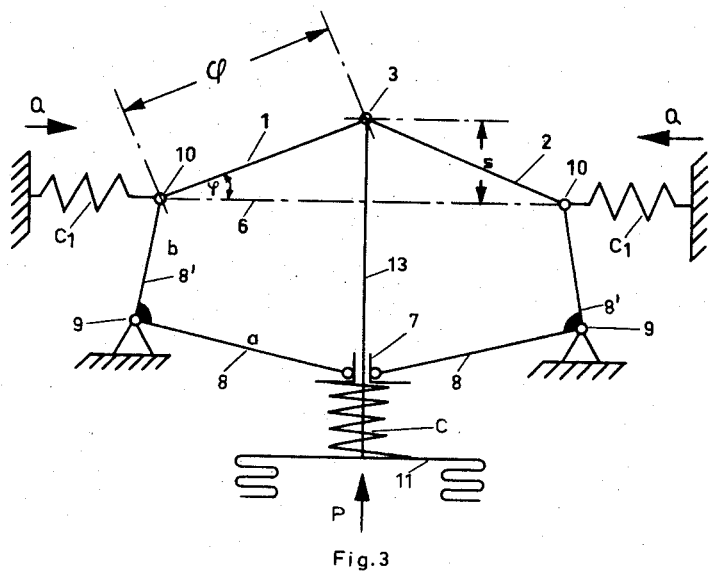

Fig. 3 shows another design of the subject matter of the invention. This equipment comprises an elbow lever 1, 2, guided by levers 8' of angle levers 8, 8' at the two ends 10, said angle lever being deflected by the displacement $s$ due to force P. Pressure spring $C_1$ acts on each of the two free lever ends at points 10. The other components of the arrangement and their designation correspond to Fig. 2.

At rest position ($s=0$) levers 1, 2 of the angle lever are in horizontal zero position 6. The pretension of spring C is zero. The pretension of springs $C_1$ is $Q_1$. In this position the system is in a state of equilibrium. Nothing changes if pressure rod 13 is assumed to be removed, because according to the condition the pretension of spring C=0. If pivot point 3 is deflected by the small amount $f$, the consequence of the two forces Q with inward direction of the two springs $C_1$ will be force component $P_1$ having the tendency of increasing the deflection. The force component is expressed:

$$P_1 = 2Q \cdot \tan \varphi$$

The forces Q are composed each of the pretension of springs $C_1$:

$$Q_1 = c_1 \cdot x_0$$

of the variation of the spring tension by displacement of the point of engagement of force 10 by the value $x$:

$$Q_2 = c_1 \cdot x$$

and of a force originating from spring C such that the displacement becomes effective on spring C with the ratio $a/b$:

$$Q_3 = c \cdot x \cdot i^2$$

if $i = a/b$ represents the leverage of angle lever 8 and $c$, $c^1$ the spring constant of springs C and $C_1$.

If now tie rod 13 is again assumed as inserted, the movement of pivot point 3 is transmitted to spring C; it is put under stress exerting on both angle levers a force at a linear function of the deflection which becomes effective at points 10 as a further component $Q_4$ which results in:

$$Q_4 = -cd \sin \varphi \cdot i$$

Consequently $P_1$ is obtained as a sum of the various components:

$$P_1 = 2 \tan \varphi \ (Q_1 + Q_2 + Q_3 + Q_4)$$
$$P_1 = 2 \tan \varphi \ [c_1(x_0-x) - ci^2 x - cd \sin \varphi \cdot i] \quad (1)$$

The displacement $x$ of point 10 is a function of the deflection angle $\varphi$ and expressed:

$$x = d(1 - \cos \varphi)$$

With small angles $\varphi$ it is possible to insert for both functions the expansion in a power series of which the terms up to the third power are to be considered. Then $$x = \frac{d}{2} \cdot \varphi^2$$

and $$tg\varphi = \varphi + \frac{\varphi^3}{3}, \ \sin \varphi = \varphi - \frac{\varphi^3}{6}$$

hence $$P_1 = 2c_1 x_0 \varphi - 2cid\varphi^2 + \left[ c_1\left(\frac{2}{3}x_0 - 1\right) - cdi^2 \right]\varphi^3$$

In the connection rod 13 proper a force $P_2$ originating from spring C is produced:

$$P_2 = cs + cix = c(s + ix)$$

As $$s = d \sin \varphi$$

hence $$P_2 = c\left( d \sin \varphi + i\frac{d}{2}\varphi^2 \right)$$

$$\sin \varphi = \varphi - \frac{\varphi^3}{6}$$

therefore $$P_2 = cd\varphi + ci\frac{d}{2}\varphi^2 - c\frac{d}{6}\varphi^3$$

The total force as a function of the angle of deflection is therefore expressed:

$$\frac{P}{cd} = \varphi\left(1 - 2\frac{c_1}{c}\frac{x_0}{d}\right) + \varphi^2 \frac{5}{2}i + \varphi^3\left[i^2 - \frac{1}{6} + \frac{c_1}{c}\left(1 - \frac{2}{3}\frac{x_0}{d}\right)\right] \quad (2)$$

This function contains components of the 1st, 2nd and 3rd power of $\varphi$; furthermore it comprises three freely selectable constants enabling the coefficients of the linear and the component of the third power to become zero.

The condition for eliminating the linear component is expressed as follows:

$$\frac{c}{c_1} = 2\frac{x_0}{d} \quad (3)$$

and that for the term of the third power:

$$i = \sqrt{\frac{1 - \frac{d}{x_0}}{2}} \quad (4)$$

When satisfying this relation, the equation of the system is:

$$\frac{P}{cd} = \frac{5}{2} i \cdot \varphi^2 \quad (5)$$

In order to obtain a maximum ratio between force P and the actual force produced in spring C, the leverage $i$ must be as large as possible. Equation 4 reveals that $i$ can only have a gain up to $\sqrt{1/2}$ if $x_0 \to \infty$, that means if springs $C_1$ are replaced by weights. Now with the relation P to $cd\varphi$, hereby making use of $\varphi$ to $\varphi$ max=0,1 radians, or about 5.5°, we obtain for $\varphi = \varphi_{max}$:

$$\frac{P}{cd\varphi} = \frac{5}{2}\sqrt{\frac{1}{2}}\varphi = 2.5 \cdot 0.7 \cdot 0.1 = 0.175 \quad (6)$$

Figure 4:
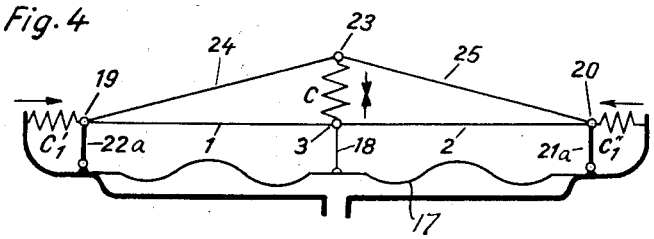
Figure 5:
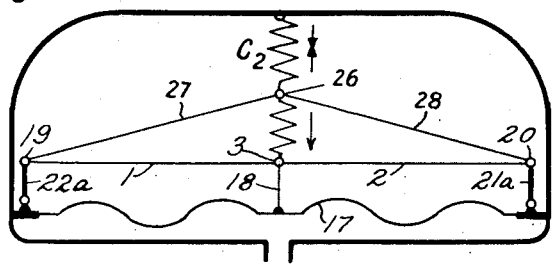
Figure 6:
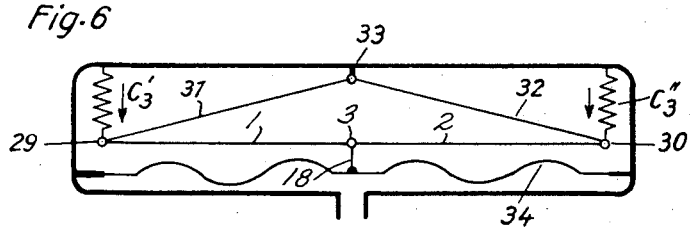

Figs. 4–6 show another design with pressure gauge. Fig. 4 shows instead of the bellow a diaphragm 17 connected to hinge 3 of elbow lever 1, 2 by means of rod 18. The elbow lever with both ends 19, 20 is displaceable in the direction of the zero position of the lever. The lever ends are guided by links 21, 22 which with the other end are arranged stationary. Spring C is inserted between pivot 3 and the point of rotation 23 of the two links 24, 25, which with their other ends are hinged with lever ends 19, 20. The force deflecting the elbow lever acts with two stationary supported pressure springs $C_1'$ and $C_1''$ on lever ends 19, 20 in the direction of the zero positions. During a deflection of the elbow lever due to a pressure in the pressure gauge a force component in the direction of deflection is produced by springs $C_1'$ and $C_1''$. At the same time spring C is compressed; its tension counteracts the force components of $C_1'$ and $C_1''$ and said springs direct across links 24, 25 serving as pressing rods. When selecting the relations accordingly, it is possible to obtain a force counteracting pressure $p$, said force being a square function of the deflection.

Links 21, 22 may consist of leaf springs and replace springs $C_1'$ and $C_1''$ if their tension is rated accordingly.

The equipment shown in Fig. 5 differs from the one of Fig. 4 by using a single tension spring $C_2$ stationary at one end and acting on joint 26 of links 27, 28 instead of pressure springs $C_1'$ and $C_1''$.

Fig. 6 illustrates a modification of the construction shown in Fig. 4, that means the ends of elbow levers 29, 30 are guided by links 31, 32 with stationary hinge 33. Springs $C_3'$ and $C_3''$ are pressure springs with unilateral stationary support acting vertical to the zero position in points 29, 30 and having a force component in the direction of the zero position directed to the elbow lever. The effect of spring C is replaced by the spring tension of diaphragm 23 of the pressure gauge.

For the arrangement of Fig. 3 the square function is correct; however there is still a hysteresis and furthermore the zero point is shifted depending on the duration and magnitude of the load, although due to the exclusively used elastic hinges there is no friction to be assumed. The reason for this phenomenon is due to the imperfection of all spring material as concerns the elastic behaviour. All known spring material has (a) a hysteresis, that means with increasing and decreasing load a different spring deflection is obtained; (b) an elastic aftereffect, that means with permanent load the deflection increases slowly per unit time so that after removal of the load the spring has no longer the same length as before; part of these effects disappears after many hours from the removal of the load; (c) creeping errors, that means part of the elastic aftereffects which even with removal of the load of any time does not disappear. These errors are termed hereinafter as "elastic defect."

If the influence of these "elastic defects" is calculated with approximately 10% of the evolved full scale value ($\varphi = 0.01$), it will be noted that an error of position is produced of the order of the scale value at this point.

The problem of eliminating this error is also solved by the invention. For this purpose two measures independent from each other are provided:

The first method provides for a strip stretched like a chord and serving as spring C, e.g. a steel strip or steel or steel wire. Due to this arrangement the zero point is determined exclusively by the geometrical arrangement and effects of hysteresis will not occur. The force for deflecting the chord is directly proportionate to the deflection if the deflections are not too large. The factor of proportionality is therefore determined by the longitudinal tension of the chord. This tension may be produced by a spring. This spring being subjected to a practically unvaried tension, its "elastic defect" will not become effective.

Furthermore there is an ideal possibility of varying the measuring range by simply varying the spring tension.

The other method envisages to obtain a maximum leverage $i$ so that $$\frac{P}{c_i d\varphi}$$

becomes as large as possible and, if possible, considerably larger than 1. It could be objected that the member of the third order of Equation 2 is no more zero. However according to the invention it is possible to keep this component negligibly small in spite of $i>15$.

One form of construction is shown diagrammatically in Fig. 4 and explained below.

The reference symbols of the two arms of the elbow lever are again 1 and 2, the hinge being designated with 3. The lever ends 10 are connected rotating with each one angle lever with arms 20 and 21, the angle lever having its stationary point of rotation at 31. The other end of each of the two angle levers carries the double arm lever 23 rotating at 22. The end of levers 23 turned away from the elbow lever is connected at 24 with one end of tension springs $C_1$, the other end 25 being stationary. Between the end 26 of lever 23 turned to the elbow lever and the free ends 10 of the elbow lever a steel strip 27 is arranged the centre 28 of which is connected to point 29 of the elbow levers by means of traverse 30 vertical on the strip. As concerns the construction of the illustration, the stretched strips 27 are arranged in the zero position of the elbow lever in a plane passing through hinge 3; furthermore in a parallel plane the arms 20 of the angle levers are disposed. The distance between these planes is assumed with $r_1$, the length of the elbow levers being again 1 and the length of the lever arms 23 $\delta_1$ and $\delta_2$.

Figure 7:
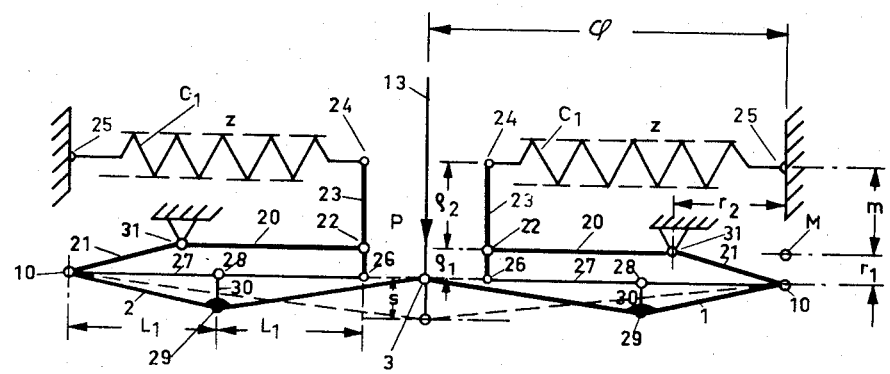

Consequently the fundamental arrangement of the equipment of Fig. 7 corresponds to that of Fig. 3, the relation $d/r_1$ corresponding to the leverage $i=a/b$ of Fig. 1. However this relation may be considerably larger than according to the above condition $\sqrt{1/2}$, e.g. $d/r_1=18$.

Levers 23 have been introduced in order to compensate again the error of the third order thus produced. By selecting accordingly the leverage of 23, it is possible to keep this error so small that it becomes only slightly noticeable in the third decimal.

There exist forces in the two hinges 10 which depend on the spring tension $z$ of springs $C_1$ and the deflection angle $\varphi$. The horizontal component H of this force consists of four components:

$$H=H_1+H_2+H_3+H_4$$

The plus sign applies to forces directed inwards.

For calculating these components a reference point M is chosen for the moments.

The component $H_1$ is produced by spring tension $z$ which with lever arm $m$ produces a moment around the reference point M. Thus, $$H_1=-\frac{m}{r_1}z$$

With the whole system in zero position, that means if $\varphi=0$, this component and its reaction in lever arms 1 and 2 are the only forces exerted on hinge 10. In this position also force P equals zero. If the applied moment of force P is deflected from its rest position by $s$, a series of new forces are produced which among others also comprise components $H_2 \ldots H_4$.

The tension force in the tension strip is expressed:

$$z \cdot \delta_2/\delta_1$$

When deflecting the tension strip by angle $\varphi$, the following force is produced at the applied moment in the centre:

$$z \cdot \frac{\delta_2}{\delta_1} \cdot 2\varphi$$

which with regard to point M produces the moment:

$$z \cdot \frac{\delta_2}{\delta_1} \cdot d_1 \cdot 2\varphi$$

If $d_1$ is the levering length of the tension strip, the component $H_2$ of the horizontal force becomes:

$$H_2 = z \cdot \frac{\delta_2}{\delta_1} \cdot \frac{d_1}{r_1} \cdot 2\varphi$$

The component $H_3$ is produced by a deflection of the elbow lever where also levers 20 are subject to a slight rotation $\varphi'$, thus obtaining an additional deflection of tension strip 27. The shifting of points 10 during a deflection of the elbow lever is denoted with $x$. This results in:

$$x = d(1-\cos \varphi) = \frac{1}{2} \cdot \varphi^2 \tag{7}$$

$$\varphi' = \frac{x}{r_1} = \frac{d}{2r_1} \cdot \varphi^2$$

Component $H_3$ may be calculated according to the equation for $H_2$ if $\varphi$ is substituted by angle $\varphi'$:

$$H_3 = z \cdot \frac{\delta_2}{\delta_1} \cdot \frac{d}{r_1} \cdot 2\varphi$$

$$H_3 = z \cdot \frac{\delta_2}{\delta_1} \cdot \frac{d_1}{r_1} \cdot 2 \frac{d}{2r_1} \cdot \varphi^2 = z \frac{\delta_2}{\delta_1} \cdot \frac{d_1 d}{r_1^2} \cdot \varphi^2$$

Finally by means of the resultant force P in both fixed points 31 each one vertical force component $H_4$ is produced. Its moment around the reference point is:

$$\frac{P}{2} \cdot r_2$$

The corresponding reaction moment being:

$$H_4 \cdot r_1$$

hence $$H_4 = -\frac{P}{2} \cdot \frac{r_2}{r_1}$$

Consequently the condition of equilibrium for the vertical forces is expressed as follows:

$$\frac{P}{2} = z \cdot \frac{\delta_2}{\delta_1} \cdot \frac{d_1}{d} \cdot 2\varphi + z \cdot \frac{\delta_2}{\delta_1} \cdot \frac{d_1}{r_1} \cdot \varphi^3 + H \cdot \varphi$$

When substituting H by $H=H_1+ \ldots +H_4$, we obtain:

$$\frac{P}{2}\left(1+\frac{r_2}{r_1}\cdot\varphi\right) = z\frac{\delta_2}{\delta_1}\left[\varphi\left(\frac{2d_1}{d}-\frac{m}{r_1}\right)+\varphi^2 \cdot 3\frac{d_1}{r_1}+\varphi^3\frac{d_1 d^2}{r_1}\right] \tag{8}$$

For the member $\varphi$ it is easy to obtain zero if the condition I:

$$2\frac{d_1}{d} - \frac{m}{r_1} = 0$$

is satisfied. The following equation will then be obtained:

$$\frac{P}{2} = z\frac{\delta_2}{\delta_1}\cdot\frac{d_1}{r_1}\cdot\varphi^2 \cdot \frac{3+\frac{d_1}{r_1}\cdot\varphi}{1+\frac{r_2}{r_1}\cdot\varphi} \tag{9}$$

It must be considered that for this arrangement $s$ equals no longer the arc described by lever arms 1 and 2 with an angle $\varphi$, for point 10 is shifted simultaneously superimposing the arc. $s$ is expressed as follows:

$$s = d \cdot \varphi + \frac{r_2}{r_1} x = d \cdot \varphi \left(1 + \frac{r_2}{2r_1} \cdot \varphi\right)$$

hereby considering Relation 7. Hence:

$$\varphi = \frac{s}{d} \cdot \frac{1}{1 + \frac{r_2}{2r_1} \cdot \varphi}$$

When inserting this relation in Equation 8:

$$P = 6z \frac{\delta_2}{\delta_1} \cdot \frac{d_1}{r_1} \left(\frac{s}{d}\right)^2 \frac{1 + \frac{1}{3} \cdot \frac{d}{r_1} \cdot \varphi}{\left(1 + \frac{r_2}{r_1} \varphi\right)\left(1 + \frac{r_2}{2r_1} \varphi\right)^2}$$

$$P = 6z \frac{\delta_2}{\delta_1} \cdot \frac{d_1}{r_1} \left(\frac{s}{d}\right)^2 \cdot D \qquad (10)$$

If now it is possible to keep the fraction D of this equation in an adequate $\varphi$ range equal to 1 with adequate accuracy, then the square relation between P and $s$ is determined. This is actually possible by selecting accordingly the constants $d$, $r_1$, $r_2$. When multiplying the denominator of the fraction, we obtain:

$$\text{denominator:}\ 1 + 2\frac{r_2}{r_1}\varphi + \left(\frac{r}{2r_1}\right)^2 \varphi^2 + \left(\frac{r_2}{r_1}\right)^3 \frac{\varphi^3}{4}$$

The member with the third power of $\varphi$ influences the result only in the third decimal if values up to 0.1 are permissible for $\varphi$. It therefore need not be taken into account. If for a first estimation also the member with the second power of $\varphi$ is neglected, we obtain the approximate defining equation:

$$1 + \frac{1}{3} \frac{d}{r_1} \varphi = 1 + 2 \frac{r_2}{r_1} \varphi$$

or $$\frac{r_2}{r_1} = \frac{1}{6} \frac{d}{r_1}$$

It is recommended to choose about 18 for $l/r_1$, thus $r_2/r_1 \approx 3$.

For obtaining an improved value for $r_2/r_1$, this approximation $r_2/r_1 = 3$ is inserted in the square member, thus obtaining:

$$1 + 2\frac{r_2}{r_1} \varphi \left(1 + \frac{r_2}{8r_1} \cdot \varphi\right) = 1 + 2 \frac{r_2}{r_1} \varphi \left(1 + \frac{3}{8} \cdot 0.1\right)$$

$$= 1 + 2 \frac{r_2}{r_1} \varphi \cdot 1.038$$

$$= 1 + 2.076 \frac{r_2}{r_1} \cdot \varphi$$

When inserting this improved value in the above defining equation, we obtain:

$$\text{condition II:}\ \frac{r_2}{r_1} = \frac{1}{2.076 \cdot 3} \cdot \frac{d}{r_1} = \frac{1}{6.25} \cdot \frac{d}{r_1} \qquad (11)$$

Due to these measures it is possible that with a high accuracy of the desired relation $s = K\sqrt{P}$, which within the whole measuring range will be less than ½% of the full scale value, an adequate stability of the zero point is ensured.

Figure 8:
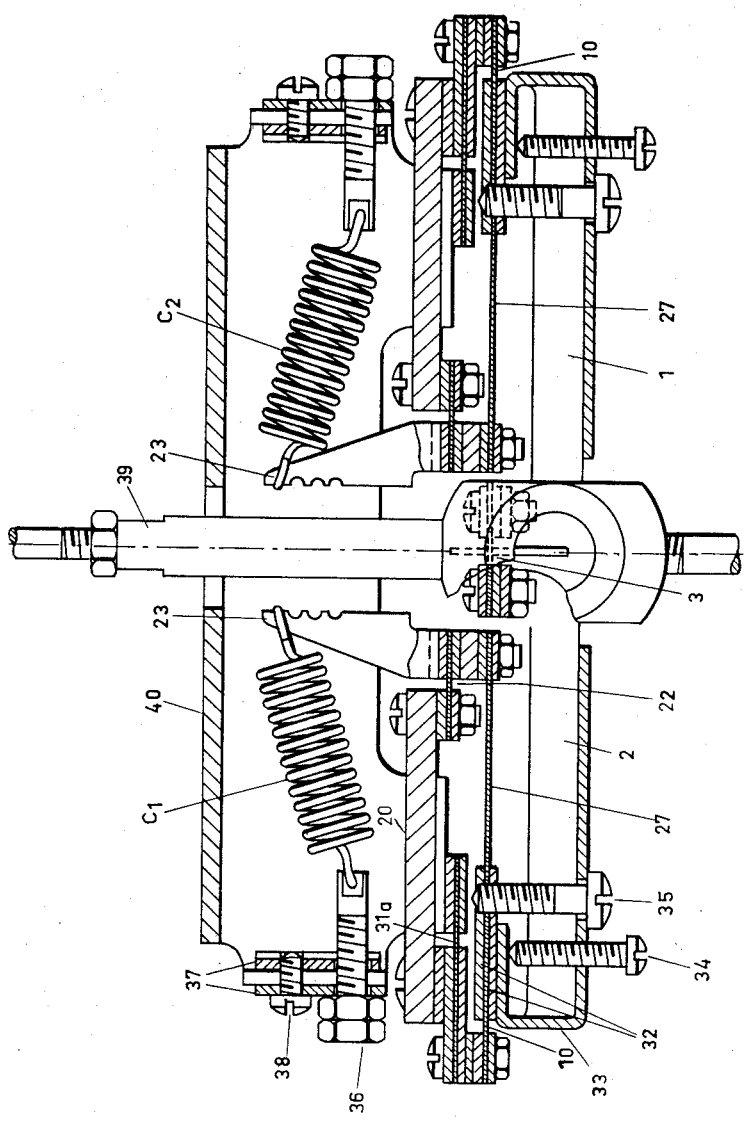

Fig. 8 shows a design according to the invention for practical use. It corresponds exactly to the schematic drawing 7.

All hinges and tension strips are leaf springs made of stainless steel reinforced at the insertion point by small welded steel tips.

The design shown in Fig. 8 is simplified as compared to the arrangement of Fig. 7 because the components of tension strip 27 arranged at the outer side of traverse 30 are connected to hinge 10. In Fig. 8 the same reference symbols are used as in Fig. 7 as far as equal components are concerned. Consequently, for instance 1 and 2 denote the two elbow levers and 27 the two tension strips. A stationary support carrying the whole equipment is denoted with 40. 10 stands for the two hinges at the ends of levers 1 and 2. They are designed as short components of tension strip 27 and represent simultaneously the outer part of the tension strips of Fig. 7, that means between 28 and 10. Point 28 is constituted in Fig. 8 by tips 32 welded to the tension strip 27. The traverses 30 of Fig. 7 are constituted by tips 32 screwed to the sheet steel plates 33, the latter being fixed to levers 1 and 2. Zero adjustment is effected by varying the length of traverses 30 by means of screws 34 and 35. Screw 35 is guided in a boring of levers 1 and 2 and in a thread of tips 32. Due to this arrangement the tips 32 can be moved in both directions and simultaneously arrested. Consequently it is also possible to compensate small differences of dead weight, e.g. different weight of diving bells, different uplift of the filling liquid of the pressure gauge, etc.

The possibility of adjustment for the measuring range etc. is given by the equation of the system which is repeated once more:

$$P = z \cdot 6 \frac{\delta_2}{\delta_1} \cdot \frac{d_1}{r_1} \left(\frac{s}{d}\right)^2 \qquad (12)$$

with conditions:

(I) $\qquad \frac{d_1}{2d} - \frac{m}{r_1} = 0$ (II) $\qquad r_2 = 0.16 d$

Equation 12 shows immediately that the tension force $z$ determines direct the measuring range. The force being produced by a spring, the measuring range can be changed by varying the tension force of said spring by means of adjusting screw (36) or by exchanging the spring in the case of considerable changes.

The values $d$, $d_1$, $r_1$, $\delta_1$, $\delta_2$ being determined by the constructional dimensions for satisfying Equation 11, a further possibility of adjustment is given for $m$. Consequently Equation 10 (condition I) is satisfied with high accuracy.

The possibility of adjustment $m$ is given by the adjusting screws for the tension of springs $C_1$ and $C_2$ being fixed on slides 37 to be arrested by screws 38. Therefore the applied moment of springs $C_1$ can be adjusted with regard to its height and thus the distance $m$ is varied.

Transmission of the forces acting on the central rod to the lever system is effected by knife edge bearings.

I claim:

1. A second power instrument device having a point of movement acted on by bias means wherein when force is applied at said point the square of the amount of displacement varies substantially directly with the applied force, said device comprising, a pair of toggle-like members pivotally connected at their inner ends, the pivotal connection including said point of movement and movable in an approximately straight working line to distended positions, each member having an outer pivotal point, the outer pivotal points and said point of movement lying in a straight line when the instrument is zeroed, an urging means acting on at least one of the members at the said outer point and approximately in the direction of the line of said zero position, to tend to urge the point of movement along the working line; an angular lever having a fixed fulcrum and for each member on which means acts and having an arm pivotally connected to such member at the outer pivotal point thereof, the other arm lying approximately perpendicular to said working line when the instrument is zeroed, and having a floating pivot, and means including a resilient part effectively connecting the floating pivot to the member to which the lever is pivoted and remote from the outer point for imparting force on the member in a direction approximately parallel with the working line when the floating pivot shifts under load, said device being proportional so that for angular movement of the members up to about at least 5½ degrees, an external force exerted on the inner pivotal point of the members equals a constant multiplied by the square of the displacement of that point in the direction of the working line.

2. In an instrument wherein an element moves against a force and the square of the distance moved is directly proportional to the force imposed, a pair of toggle-like members of equal length substantially pivotal together at the inner ends thereof, the pivotal point being said element, and having pivotally mounted outer ends, the three pivotal points substantially lying in a straight line when the instrument is zeroed, and bias means for acting on the members to counter upon displacement of the element, a force applied to said element in a direction perpendicular to said line to displace the element in said direction, each reactive force on the element which varies linearly with the displacement of the element acting in the direction of said straight line.

3. In an instrument wherein an element moves against a force and the square of the distance moved is directly proportional to the force imposed, a pair of toggle-like members of equal length substantially pivotal together at the inner ends thereof, the pivotal point being said element, and having pivotally mounted outer ends, the three pivotal points substantially lying in a straight line when the instrument is zeroed, and bias means for acting on the members to counter, upon displacement of the element, a force applied to said element in a direction perpendicular to said line to displace the element in said direction, each reactive force on the element which varies linearly with the displacement of the element acting in the direction of said straight line, said bias means comprising, means for exerting a substantially constant force on one of the members at the pivot point of the outer end thereof, and spring means for counteracting force on the member end due to the displacement of the element, the characteristics of the spring means being such that force exerted on the element and perpendicular to said line is proportional to the second power of the displacement of the element.

4. A second power instrument device having a point of movement acted on by bias means wherein when force is applied at said point the square of the amount of displacement varies substantially directly with the applied force, said device including, a pair of symmetrical toggle members pivotally connected at their inner ends, the pivotal connection including said point of movement and movable in an approximately straight working line to distended position, each member having an outer pivotal point, the outer pivotal points and said point of movement lying in a straight line when the instrument is zeroed, urging elements acting on each of the members at said outer point and approximately in the direction of the line of said zero position, an angular lever having a fixed fulcrum for each member and having an arm pivotally connected to such member at the outer pivotal point thereof, the other arm lying approximately perpendicular to said working line when the instrument is zeroed and having a floating pivot, and means including a resilient part effectively connecting the floating pivot to the member to which the lever is pivoted and remote from the outer points for imparting force on the member in a direction approximately parallel with the working line when the floating pivot shifts under load.

5. In an instrument having an element displaceable along a working straight line wherein the square of the displacement is proportional to force acting on the element in the direction of the working line, a pair of toggle-like members pivoted together at their inner end, the pivotal point being said element and movable along the working line, the members having outer pivotal points equidistant from said element and disposable substantially in a common line with the element; spring means acting on the outer pivotal points substantially in the direction of said common line; levers for symmetrically shifting said outer points when the element moves in the working line, and bias means acting on the levers, said levers having substantially fixed fulcra.

6. In an instrument as claimed in claim 5, and levers respectively connected to each respective spring means and aforementioned levers.

7. In an instrument as claimed in claim 6 the second mentioned levers each having a fulcrum at an end of the first mentioned lever.

8. In an instrument as claimed in claim 5 each of said levers having an arm pivotally mounted on one of the members at the outer pivotal point thereof, and another arm of greater length effectively connected to the bias means.

9. In a second power instrument device as claimed in claim 5, the spring and bias means normally acting with forces making an angle with each other of $n \times 90°$ where $n$ is a whole number.

10. A device having a point of movement in a straight working line acted on by bias means wherein when force is applied at said point the square of the amount of displacement varies substantially directly with the applied force, said device including, a pair of symmetrically formed toggle members effectively pivoted together at said point of movement and having outer pivotal points, two symmetrical sets of bias means, one for each member and acting on the outer pivotal point thereof, the latter being free to move under the influence of both sets of bias means, the major components of force of one bias means being in a direction parallel with members in straight line out-stretched position and the other bias means having the major component of force thereof making an angle of $n \times 90°$ with the other force, where $n$ is a whole number, the two sets of bias means being of such proportionate strength so that in cooperation with movement of the outer pivotal points the said point of movement reacts against an external force thereat and along the working line in the relationship wherein the square of the displacement is proportional to the external 11. A second power instrument device having a point of movement acted on by bias means wherein when force is applied at said point the square of the amount of displacement varies substantially directly with the applied force, said device comprising, a symmetrical pair of toggle members pivotally connected at their inner ends, the pivotal connection including said point of movement and displaceable in an approximately straight working line to distended position, each member having an outer pivotal point, the outer pivotal points and said point of movement lying in a straight line when the instrument is in zero position, and bias means for acting on the members to constrain the amount of displacement of the point of movement under an external force to a degree that the square of the displacement is proportional to the external force.

12. In a device as claimed in claim 11 said bias means including symmetrical members symmetrical with respect to each other and each pivoted to the outer pivotal point of the respective toggle members for urging the outer pivotal points substantially along the straight line of zero position with substantially the same force.

13. In a device as claimed in claim 12 and a shifting lever for each toggle member and having an end pivoted to said outer pivotal point for shifting a part of the bias means when said pivotal outer point shifts in a direction parallel with the working line.

14. In a device as claimed in claim 13 said lever having a fixed fulcrum.

15. In a device as claimed in claim 14 said part including a tension spring having a fixed support and floating lever attached to the tension spring at one end of the lever and to an end of said symmetrical member at the other end of the floating lever, the fulcrum of the floating lever being pivoted to the other arm of the shifting lever.

16. In a device as claimed in claim 15, the arms of the floating lever being substantially parallel with the working line when the instrument is in zero position.

17. In an instrument as claimed in claim 16, and tie means remote from the outer pivotal points of the toggle members and secured to the toggle members and to the symmetrical members.

18. In an instrument as claimed in claim 11 said bias means including symmetrical members each pivoted at the outer pivotal point to the toggle members and to each other at a common point.

19. In a device as claimed in claim 18 and a resilient member having respective ends thereof pivotally attached to said point of movement and common point.

20. In an instrument as claimed in claim 11, said bias means including a pair of springs each having an end at said outer pivotal points of the toggle members and acting in a direction parallel with the working line.

References Cited in the file of this patent

UNITED STATES PATENTS

| | | |
|---|---|---|
| 2,093,254 | Spitzglass | Sept. 14, 1937 |
| 2,096,032 | Engel | Oct. 19, 1937 |
| 2,190,506 | Wurr | Feb. 13, 1940 |
| 2,328,306 | Svoboda | Aug. 31, 1943 |
| 2,873,911 | Perrine | Feb. 17, 1959 |

FOREIGN PATENTS

| | | |
|---|---|---|
| 720,875 | Germany | Apr. 16, 1942 |